United States Patent [19]
Taniguchi et al.

[11] Patent Number: 5,404,234
[45] Date of Patent: Apr. 4, 1995

[54] PROJECTOR USING A HOLOGRAM

[75] Inventors: Naosato Taniguchi, Machida; Hideaki Mitsutake, Tokyo, both of Japan

[73] Assignee: Canon Kabushiki Kaisha, Japan

[21] Appl. No.: 812,635

[22] Filed: Dec. 23, 1991

[30] Foreign Application Priority Data

Dec. 27, 1990 [JP] Japan .................. 2-415261

[51] Int. Cl.6 .................. G02B 5/32; G02B 27/14; H04N 9/31; G03B 21/00
[52] U.S. Cl. .................. 359/15; 359/634; 353/31; 348/744; 348/41
[58] Field of Search .................. 359/1, 15, 253, 267, 359/272, 618, 629, 634, 495, 40, 41; 353/20, 30, 31, 34; 340/784; 358/60, 61, 231, 232

[56] References Cited

U.S. PATENT DOCUMENTS

| 3,622,220 | 11/1971 | Kogelnik | 359/195 X |
| 4,786,146 | 11/1988 | Ledebuhr | 353/20 X |
| 4,832,427 | 5/1989 | Nanba et al. | 359/15 |
| 4,850,685 | 7/1989 | Kamakura et al. | 353/31 X |
| 4,864,390 | 9/1989 | McKechnie et al. | 358/60 |
| 4,930,847 | 6/1990 | Cederquist | 359/15 |
| 4,989,076 | 1/1991 | Owada et al. | 358/61 |
| 5,028,121 | 7/1991 | Baur et al. | 359/40 |
| 5,042,921 | 8/1991 | Sato et al. | 359/40 |

FOREIGN PATENT DOCUMENTS

| 0287034 | 10/1988 | European Pat. Off. | 359/634 |
| 54-55456 | 5/1979 | Japan . | |
| 61-13885 | 1/1986 | Japan . | |
| 2222892 | 3/1990 | United Kingdom . | |

OTHER PUBLICATIONS

Patent Abstracts of Japan, vol. 10, No. 158 (E-409), Jun. 6, 1986; Japan 61 013 885 to Nagamuro Masami.
Patent Abstracts of Japan, vol. 15, No. 95 (P-1176), Mar. 7, 1991; Japan 2,302,294 to Kyocera Group.

Primary Examiner—William L. Sikes
Assistant Examiner—David R. Parsons
Attorney, Agent, or Firm—Morgan & Finnegan

[57] ABSTRACT

This specification discloses a method of dividing a radiation beam into a first beam and a second beam differing in color from each other, modulating the first and second beams to thereby form first and second modulated beams indicative of images differing in color from each other, and projecting the images by the use of the first and second modulated beams. The radiation beam is divided into the first and second beams by a hologram. The specification also discloses a projector having a first optical system provided with a first volume type holograms for reflectively diffracting a first beam of a certain color in a radiation beam from a radiation source and transmitting a second beam of another color therethrough to thereby resolve the radiation beam, means for modulating the first beam and generating a first modulated beam indicative of a first image, and modulating the second beam and generating a second modulated beam indicative of a second image, and a second optical system provided with a second volume type hologram for reflectively diffracting the first modulated beam and transmitting the second modulated beam therethrough to thereby combine the two beams, the second optical system projecting the first and second images onto a predetermined plane by the use of the combined beams.

19 Claims, 6 Drawing Sheets

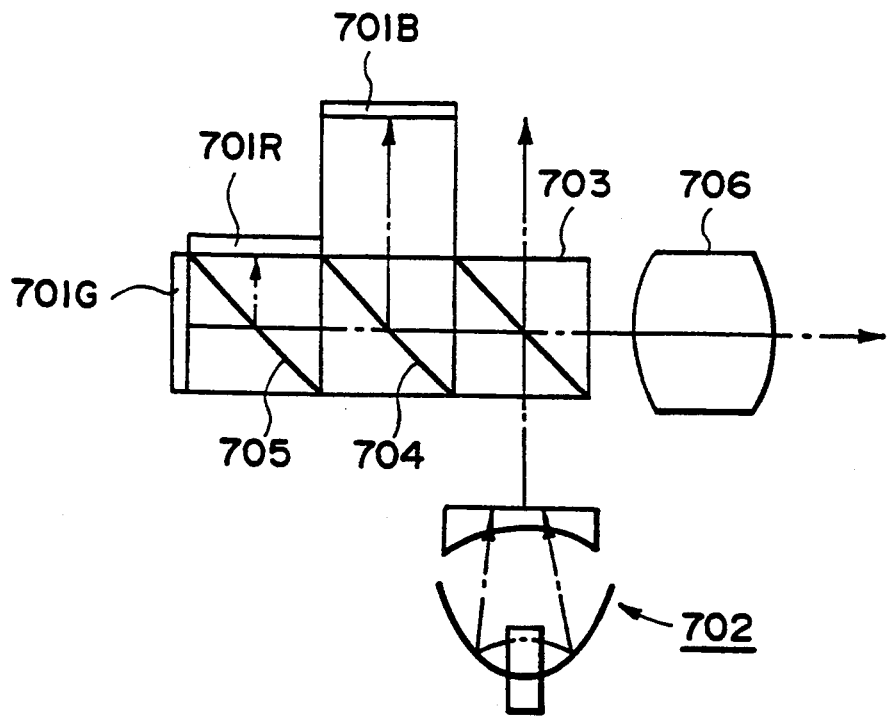
(PRIOR ART) FIG. 1
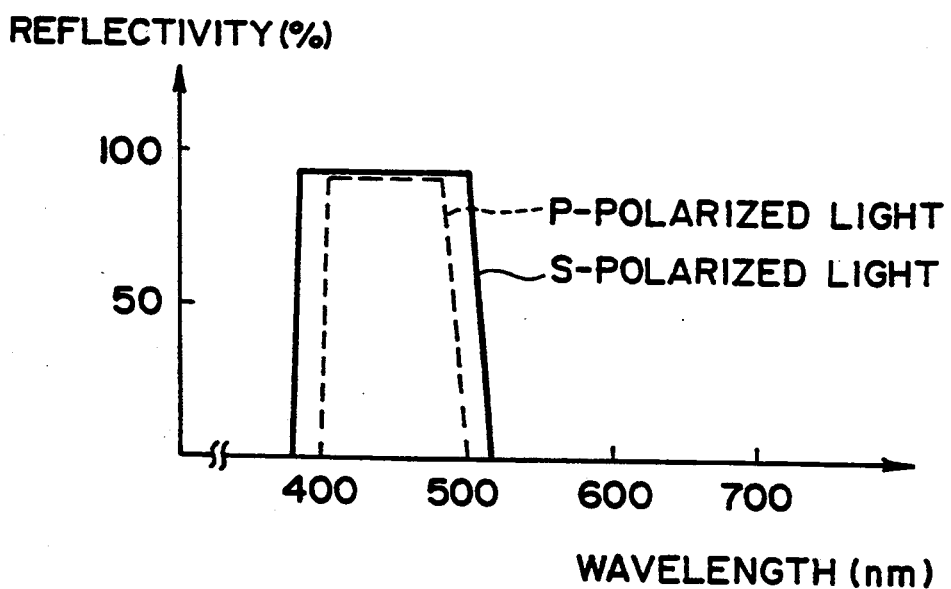
FIG. 2
(PRIOR ART)

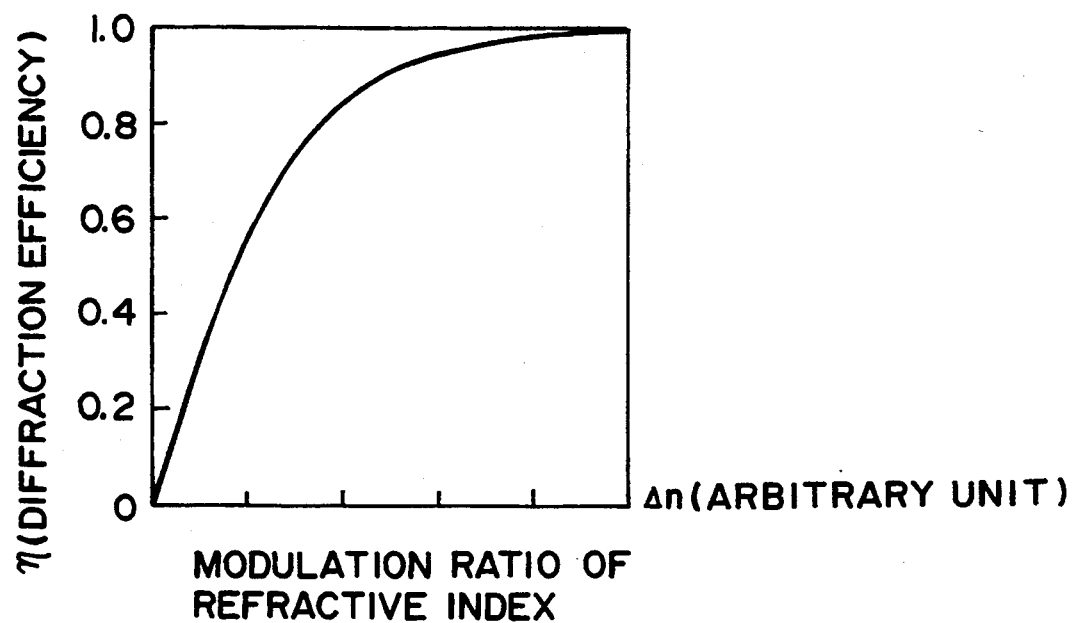
F I G. 3
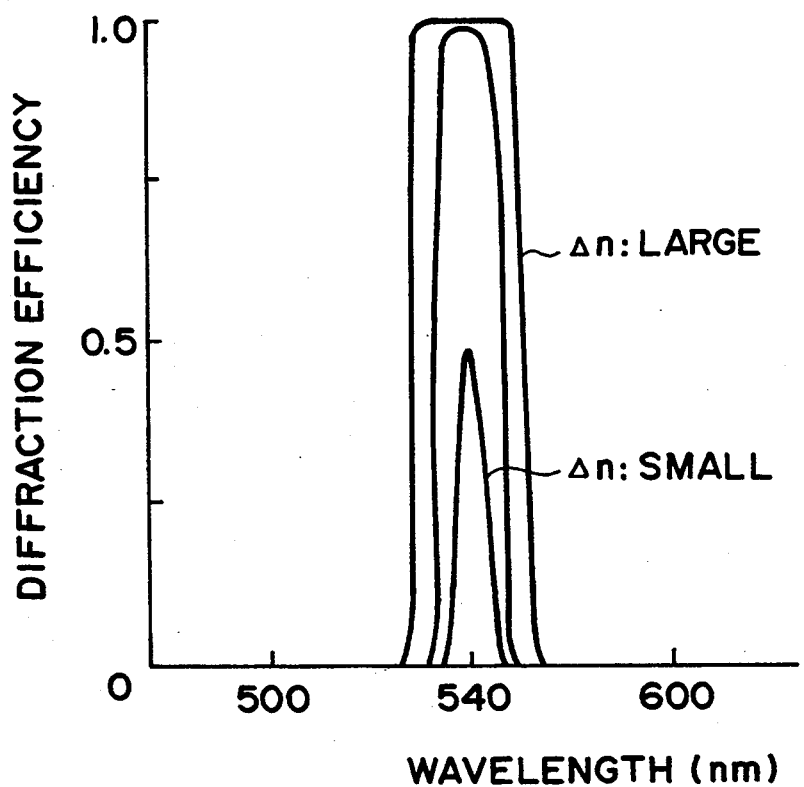
F I G. 4

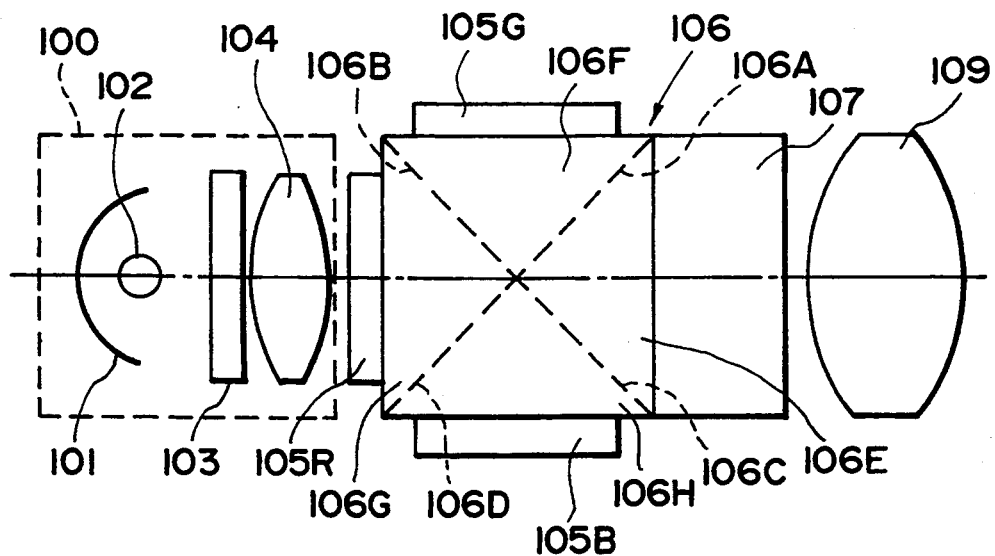
F I G. 5A
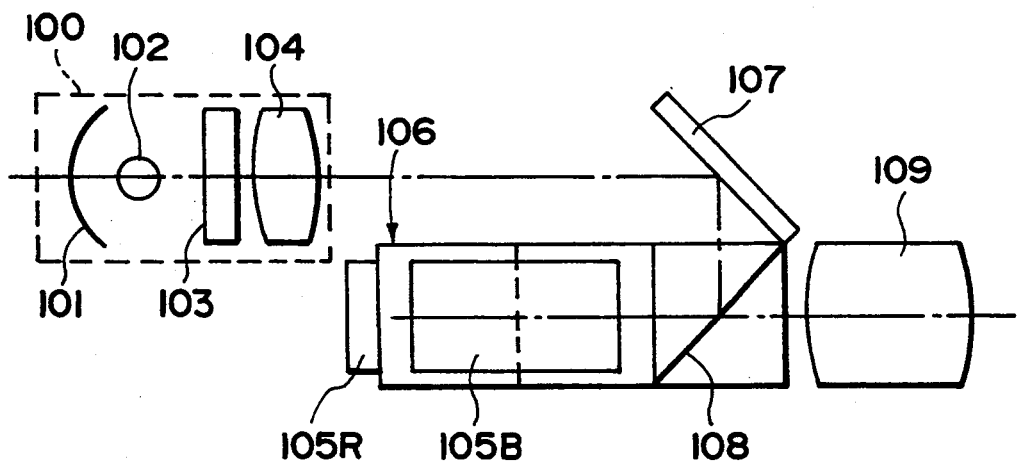
F I G. 5B

PROJECTOR USING A HOLOGRAM

BACKGROUND OF THE INVENTION

1. Field of the Invention

This invention relates to a projector using a hologram.

2. Related Background Art

As a prior-art projector, there is known one of a construction as shown in FIG. 1 of the accompanying drawings wherein a polarizing beam splitter 703 is disposed at the destination of emergence of white parallel light emitted from a light source unit 702 and further, first and second dichroic mirrors 704 and 705 formed on the cemented surface of 45° rectangular prisms for separating S-polarized light reflected by the polarizing beam splitter 703 into red, green and blue lights and applying these color lights to first to third liquid crystal panels 701R, 701G, 701B of the reflection type which form image lights of respective colors and combining the image lights of respective colors which have emerged from the first to third liquid crystal panels 701R, 701G, 701B are successively arranged in the optical path of said S-polarized light and the image lights combined by the first and second dichroic mirrors 704 and 705 are projected toward a screen, not shown, through a projection lens 706 to thereby form an enlarged color image on the screen (see, for example, Japanese Laid-Open Patent Application No. 61-13885).

As the first to third liquid crystal panels 701R, 701G, 701B of the reflection type, use is made of those of electrically controlled birefringence (ECB) type, which have the characteristic of rotating the plane of polarization of incident S-polarized light by an applied voltage conforming to an image signal for each color.

In the liquid crystal type projector of the above-described construction, of the substantially parallel white light emitted from the light source unit 702, the S-polarized light is reflected by the polarizing beam splitter 703, and the S-polarized light is separated into red, green and blue lights by the first and second dichroic mirrors 704 and 705, and these color lights are applied to the first to three liquid crystal panels 701R, 701G, 701B corresponding to the respective color lights. The color lights reflected by the first to third liquid crystal panels 701R, 701G, 701B include a ray of P-polarized component having its plane of polarization rotated in conformity with an image signal input to each picture element of each panel and a ray of S-polarized component not subjected to the rotation of the plane of polarization, and those color lights are again combined by the first and second dichroic mirrors 704 and 705, and thereafter travel toward the polarizing beam splitter 703. The P-polarized component of each color light is transmitted through the polarizing beam splitter 703 and projected onto the screen, not shown, through the projection lens 706, and the S-polarized component of each color light is reflected by the polarizing beam splitter 703 and returns toward the light source unit 702.

However, the above-described prior-art projector suffers from the following problem. The light beam incident on the first and second dichroic mirrors for effecting the color separation of light and the combination of color lights has its direction of polarization varied before and after the reflection by the first to third liquid crystal panels for forming the image lights of respective colors, i.e., during the color separation by the first and second dichroic mirrors and during the color combination by these dichroic mirrors. In a dichroic mirrors and during the color combination by these dichroic mirrors. In a dichroic mirror of optical multilayer film formed on the cemented surface of 45° rectangular prisms, like the above-described first and second dichroic mirrors, taking the light of blue wavelength range as an example, the reflection band width of S-polarized component is wide as compared with that of P-polarized component, as shown in FIG. 2 of the accompanying drawings, and reflection characteristic differs depending on the polarized components. Accordingly, when as in the aforedescribed liquid crystal projector shown in FIG. 1, the incident light onto the liquid crystal panel corresponding to each color is S-polarized light, the reflected light from that liquid crystal panel becomes P-polarized light and therefore, part of each color image light reflected from each liquid crystal panel is lost.

SUMMARY OF THE INVENTION

The present invention has been made in view of the above-noted problem peculiar to the prior art and the object thereof is to provide a projector which is high in light utilization efficiency and which makes it possible to obtain clear-cut images.

In order to achieve the above object, the projector of the present invention utilizes the following novel image projection methods.

A first image projection method is a method of dividing a radiation beam into a first beam and a second beam differing in color from each other, modulating said first and second beams to thereby form first and second modulated beams indicative of images differing in color from each other, and projecting said images by the use of said first and second modulated beams, characterized in that said radiation beam is divided division into said first and second beams by a hologram. A second image projection method is a method of modulating first and second beams differing in color from each other to thereby form first and second modulated beams indicative of images differing in color from each other, combining said first and second modulated beams, and projecting said images by the use of said combined first and second modulated beams, characterized in that said first and second modulated beams are combined by a hologram.

A third image projection method as an improved one is a method of dividing a radiation beam into a first beam and a second beam differing in color from each other, modulating said first and second beams to thereby form first and second modulated beams indicative of images differing in color from each other, combining said first and second modulated beams, and projecting said images by the use of said combined first and second modulated beams, characterized in that some portion of said radiation beam is reflectively diffracted by a hologram and the other portion of said radiation beam is transmitted through it, thereby forming said first and second beams. A fourth image projection method as a more improved one is a method of dividing a radiation beam into a first beam and a second beam differing in color from each other, modulating said first and second beams to thereby form first and second modulated beams indicative of images differing in color from each other, combining said first and second modulated beams, and projecting said images by the use of said combined first and second modulated beams, characterized in that said first modulated beam is reflectively diffracted by a hologram and said second modulated beam is transmitted through it to thereby combine said first and second modulated beams.

The projector in a first form of the present invention has a first optical system provided with a first volume type hologram for reflectively diffracting a first beam of a certain color of a radiation beam from a radiation source and transmitting a second beam of another color therethrough to thereby resolve said radiation beam, means for modulating said first beam and generating a first modulated beam indicative of a first image, and modulating said second beam and generating a second modulated beam indicative of a second image, and a second optical system provided with a second volume type hologram for reflectively diffracting said first modulated beam and transmitting said second modulated beam therethrough to thereby combine said two beams, said second optical system projecting said first and second images onto a predetermined plane by the use of said combined beams.

The projector in a second form of the present invention has means for supplying a substantially collimated beam including first, second and third means differing in color from one another, a polarizing beam splitter provided in the path of said collimated beam, a first light valve for reflecting said first beam and modulating the plane of polarization thereof to thereby form a first image, a second light valve for reflecting said second beam and modulating the plane of polarization thereof to thereby form a second image, a third light valve for reflecting said third beam and modulating the plane of polarization thereof to thereby form a third image, an optical system provided with first and second volume type holograms for resolving said collimated beam from said polarizing beam splitter into said first, second and third beams and directing these beams to respective ones of said light valves and combining said first, second and third beams reflected and modulated by respective ones of said light valves and directing said combined beams to said polarizing beam splitter, said first volume type hologram reflectively diffracting said first beam, said second volume type hologram reflectively diffracting said second beam, and a projection optical system for receiving said first, second and third beams reflected and modulated by said light valves, respectively, through said polarizing beam splitter and projecting said images onto a predetermined plane by the use of the respective beams.

BRIEF DESCRIPTION OF THE DRAWINGS

FIG. 1 is a plan view showing an example of the projector according to the prior art.

FIG. 2 is a graph showing an example of the reflection characteristic of the dichroic mirror used in the prior-art projector shown in FIG. 1.

FIG. 3 is a graph showing the characteristic of diffraction efficiency to the modulation ratio of refractive index Δn of a reflection type volume phase hologram.

FIG. 4 is a graph showing a variation in wavelength selectivity to the modulation ratio of refractive index Δn of the reflection type volume phase hologram.

FIGS. 5A and 5B are a plan view and a side view, respectively, showing the construction of an embodiment of the present invention.

DETAILED DESCRIPTION OF THE PREFERRED EMBODIMENTS

Figure 6:
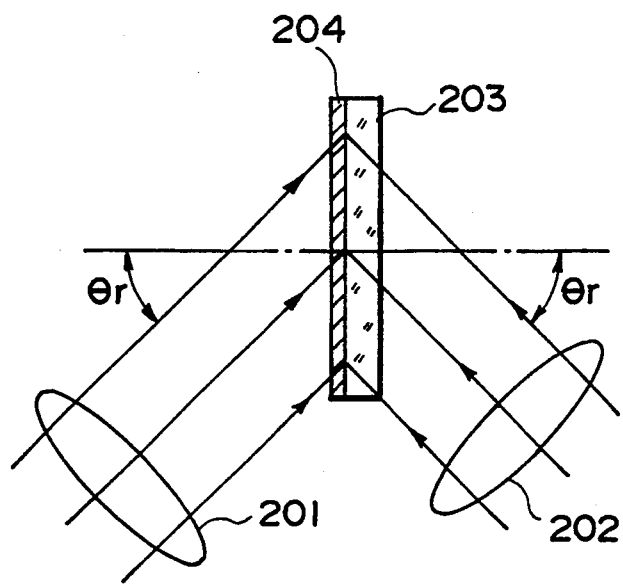
FIG. 6 is a schematic view showing a first method of making holograms used in the present invention.

Description will first be made of the principle and action of a hologram used in the present invention.

FIG. 3 shows the result of having obtained the diffraction efficiency $\eta$ of a reflection type hologram at the peak wavelength of incident light (in a wavelength spectrum) as a function of the modulation ratio of refractive index $\Delta n$ of the hologram by the use of Kogelnik's combined wave theory (Bell Syst. Tech. J., vol. 48 (1969), pp. 2909–2947). The diffraction efficiency at the peak wavelength gradually approaches 100% as the modulation ratio of refractive index $\Delta n$ is made greater. FIG. 4 graphically shows the manner of variation in the reflection. Band width of this hologram at this time. As the modulation ratio of refractive index $\Delta n$ is made greater, the diffraction efficiency reaches 100% and thereafter, the band width becomes wider with the diffraction efficiency kept at 100%. This band width has the characteristic of being little affected by the direction of polarization (P-polarization and S-polarization) of the incident light.

In the projector of the present invention, a hologram is used for at least one of color separation and color combination, and even if the direction of polarization varies during color separation and during color combination, the reflection band width is made substantially coincident with the light beam entering, for example, a hologram which effects color separation and combination to thereby make the loss of image light of each color from each liquid crystal panel small.

A hologram can be made by recording an interference fringe pattern by a laser beam on a sensitive material and therefore, an element of large area can be made, and if use is made of the single light beam exposure method which will be described later, it is suited for mass production and the productivity thereof is very excellent as compared with an element made by vacuum evaporation, such as dichroic multilayer film.

FIGS. 5A and 5B are a plan view and a side view, respectively, showing an example of the projector of the present invention.

The projection type display apparatus which is a projector has a light source unit 100 comprising a reflecting mirror 101, a light source 102, a heat cutting filter 103 and a condenser lens 104, a hologram prism (hereinafter referred to as the cross hologram prism) 106 having structure similar to that of a cross dichroic prism and having reflection type liquid crystal light bulbs 105R, 105G and 105B for red, green and blue, respectively, adhesively secured to the three sides thereof, a reflecting mirror 107 for reflecting a substantially collimated light beam from the light source unit 100 downwardly at a right angle, a polarizing beam splitter 108 for reflecting the S-polarized component of the light beam reflected by the reflecting mirror 107 at a right angle and directing it to the cross hologram prism 106 and transmitting the P-polarized component of said light beam therethrough, and a projection lens 109 provided on that side of the polarizing beam splitter 108 which is opposite to the cross hologram prism.

The cross hologram prism 106 forms color separating-combining means, and comprises first to fourth 45° rectangular prisms 106E, 106F, 106G and 106H cemented together with the vertex of 90° of each prism as the center, and first to fourth holograms 106A, 106B, 106C and 106D are formed on the respective cemented surfaces thereof as shown in FIG. 5A. Each of these four holograms comprises a volume type hologram, and that surface of the cross hologram prism 106 which corresponds to the inclined surface of the first 45° rectangular prism 106E provides an entrance surface for the light beam reflected by the polarizing beam splitter 108, and first, second and third reflection type liquid crystal light bulbs 105G, 105R and 105B are mounted on those surfaces thereof which correspond to the inclined surfaces of the second to fourth 45° rectangular prisms 106F, 106G and 106H.

The first and fourth holograms 106A and 106D have the characteristic of reflecting blue light and transmitting the other color lights therethrough, and reflect the blue light component of the light beam incident on the cross hologram prism 106 and cause it to enter the third reflection type liquid crystal light bulb 105B.

The second and third holograms 106B and 106C have the characteristic of reflecting green light and transmitting the other color lights therethrough, and reflect the green light component of the light beam incident on the cross hologram prism 106 and cause it to enter the first reflection type liquid crystal light bulb 105G. Accordingly, the red light component of the light beam incident on the cross hologram prism 106 is transmitted through the four holograms 106A–106D and enters the second reflection type liquid crystal light bulb 105R.

The white collimated light beam emitted from the light source unit 100 is totally reflected by the reflecting mirror 107 and enters the polarizing beam splitter 108. A light beam having polarization parallel to the acting surface of the polarizing beam splitter 108 (S-polarized light) is reflected by this acting surface and enters the cross hologram prism 106. On the other hand, the polarized component not parallel to the acting surface of the polarizing beam splitter 108 (P-polarized light) is transmitted through this acting surface and does not act as image light. Thus, at this time, the polarizing beam splitter 108 is working as a polarizer. The polarized component parallel to the acting surface of the polarizing beam splitter 108 which is used as image light is P-polarized light when viewed from the acting surface of the cross hologram prism 106.

The P-polarized light beam is separated into red, green and blue light beams R, G and B by the cross hologram prism 106 on which are formed the first to fourth holograms 106A, 106B, 106C and 106D having little polarization dependency, as previously described, and these light beams R, G and B enter the first to third reflection type liquid crystal light bulbs 105R, 105G and 105B for red, green and blue, respectively. Liquid crystal used in the first to third reflection type liquid crystal light bulbs 105R, 105G and 105B is of the ECB (electrically controlled birefringence) type or the 45° TN (45° twisted nematic) type, and has the nature of rotating the plane of polarization of incident light by a voltage applied in conformity with an image signal of each color.

Accordingly, each of the incident lights onto the first to third reflection type liquid crystal light bulbs 105R, 105G and 105B is a rectilinearly polarized light beam comprising a P-polarized component, while the reflected light from each light bulb becomes a light beam having an S-polarized component and a P-polarized component in conformity with a signal input to each picture element of each light bulb.

The lights reflected from the first to third reflection type liquid crystal light bulbs 105R, 105G and 105B are combined by the cross hologram prism 106, whereafter they are returned to the polarizing beam splitter 108.

Since the cross hologram prism 106 has little polarization dependency as described earlier, the P-polarized component entering the prism 106 is directed as a predetermined color light to each light bulb substantially without loss. Also, of the light beams which have entered the first to third reflection type liquid crystal light bulbs 105R, 105G and 105B as P-polarized light, the component converted into S-polarized light is of course returned to the polarizing beam splitter 108 without loss.

At this time, the polarizing beam splitter 108 operates as an analyzer and transmits therethrough the S-polarized component of said combined reflected lights (the P-polarized component to the acting surface of the polarizing beam splitter 108), and this S-polarized component is projected as image light onto a screen, not shown, through the projection lens system 109. On the other hand, the P-polarized component of said combined reflected lights (the S-polarized component to the acting surface of the polarizing beam splitter 108) is reflected upwardly at a right angle and returns to the light source unit 100.

As in the present embodiment, the holograms for effecting the color separation and color combination of the light beam are constructed of a cross hologram prism, whereby the back focal length can be shortened.

Although the present embodiment has been described with respect to a case where a cross hologram prism is used, it is also possible to use holograms instead of the dichroic mirrors of the projection type display apparatus of FIG. 1, and in this case, there is obtained the same effect that there is no loss of the quantity of light. Also, as the light bulbs, use can be made of ones of the type which scatters or diffract the incident light to thereby effect light modulation.

Where in the projection type display apparatus shown in the present embodiment, the cross hologram prism 106 is rotated by 90° and disposed upright with the light bulbs remaining mounted thereon and design is made such that the rectilinearly polarized lgiht (P-polarized light or S-polarized light) to the acting surface of the polarizing beam splitter 108 is polarized light in the same direction also to the first to fourth holograms 106A, 106B, 106C and 106D of the cross hologram prism 106, the P-polarized component of the combined reflected lights becomes image light, but in the cross hologram prism 106, this P-polarized component is also returned to the polarizing beam splitter 108 substantially without loss and therefore, an effect similar to that of the present embodiment can be obtained.

Description will now be made of a method of making the holograms used in each of the above-described embodiments and the characteristic thereof.

FIG. 6 schematically shows a method of making the holograms used in the present embodiment.

Light from a laser (not shown) such as an Ar laser is divided into two light beams by a half mirror (not shown), and these light beams are made into collimated laser beams 201 and 202 by a collimator lens (not shown).

The laser beams 201 and 202 are incident on a hologram photosensitive material 204 applied to or retained on a transparent substrate 203 such as glass or plastic, at the same incident angel $\theta_r$ from the opposite sides of the hologram photosensitive material 204, and form interference fringes. The hologram photosensitive material 204 exposed by such an interference fringe pattern becomes a hologram via a suitable treatment process such as development.

In this case, the hologram photosensitive material 204 used may be one of various materials such as gelatin bichromate and photopolymer, but may preferably be a material which can make the modulation ratio of refractive index $\Delta n$ great as shown in FIG. 2.

The incident angle $\theta_r$ of the laser beams 201 and 202 which provide recording light can be simply found from the following equation when the refractive index $n_1$ of the hologram photosensitive material 204 and the average refractive index $n_2$ of the holograms are equal to each other and there is no variation in the film thickness of the holograms by the developing process or the like:

$$\cos \theta'_r = \lambda_r/\lambda_p \cos \theta'_{in}$$

where $\lambda_r$ is the wavelength of the recording light, $\lambda_p$ is the main wavelength for color separation and combination (the diffraction center wavelength of the holograms, $\theta'_r$ is the incident angle of the recording light in the hologram photosensitive material 204, and $\theta_{in}$ is the incident angle, in the holograms, of the light beam emitted from the light source unit 50 and incident on the holograms. By somewhat changing the above calculation expression, a similar calculation can also be accomplished when the refractive index $n_1$ of the hologram photosensitive material 204 and the average refractive index $n_2$ of the holograms are not equal to each other or when the film thickness of the holograms is varied by the developing process, but the description of this is omitted herein.

In the present embodiment, in the green light reflecting hologram when the wavelength $\lambda_r$ of the recording light is $\lambda_r=514.5$ nm by the use of a hologram photosensitive material 204 in which $n_1=n_2=1.5$ the center wavelength $\lambda_p$ is $\lambda_p=\lambda_B=537$ nm and $\theta'_{in}=28.13°$ (in the holograms) and accoridngly, $\theta'_r=32.33°$ (in the hologram photosensitive material 204), and the laser beams 201 and 202 can be caused to enter the photosensitive material 204 at an angle of $\theta_r=53.34°$ in the air. Likewise, with regard also to the blue light reflecting hologram, the incident angle of the recording light can be found. This also holds true of a case where recording is effected with laser light of other oscillation wavelength.

Figure 7:
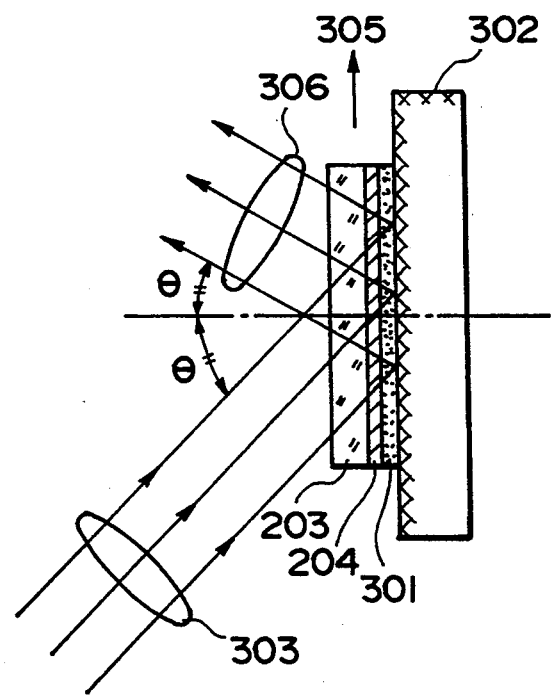
FIG. 7 is a schematic view showing a second method of making the holograms used in the present invention.

FIG. 7 shows a method of making a hologram by a single light beam exposure method. This is a method using a light beam reflected by a reflecting mirror 302 as one of the two light beams in the two-light-beam exposure method shown in FIG. 6.

A laser beam from a laser such as an Ar layer, not shown, is converted into a laser beam 303 by a collimator lens or the like and is incident from the substrate 203 side at an incident angle $\theta_r$. The incident light beam 303 is transmitted through a hologram photosensitive material 204 and index matching liquid 301, is reflected by the reflecting mirror 302 and becomes a light beam 306, which is again incident on the hologram photosensitive material 204. If at this time, the surface of the hologram photosensitive material 204 and the surface of the reflecting mirror 302 are kept parallel to each other, an interference fringe pattern similar to that in FIG. 7 can be obtained because the angle of reflection is $\theta_r$.

In this method, the index matching liquid is not always necessary, but by using liquid or the like having substantially the same refractive index as that of the hologram photosensitive material 204, an unnecessary interference fringe pattern can be prevented from being recorded in the hologram photosensitive material 204.

Also, the positional relationship between the substrate 203 and the hologram photosensitive material 204 may be opposite to that shown in FIG. 7, that is, the surface of the substrate 203 may face the reflecting mirror 302, and the refractive index of the index matching liquid in this case is chosen to one approximate to the refractive index of the substrate 203.

Figure 8:
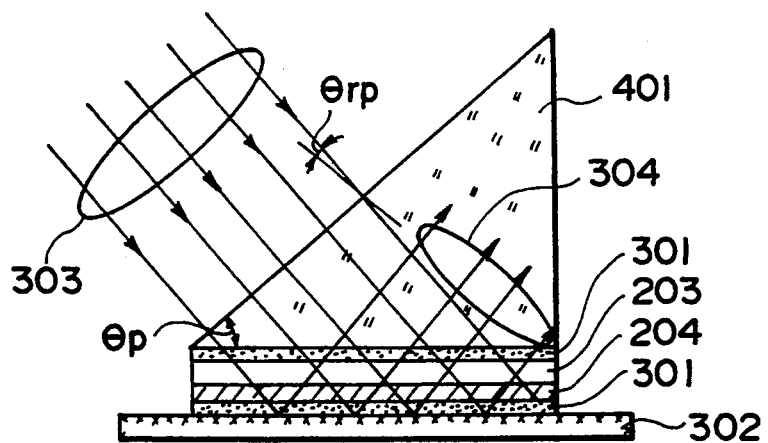
FIG. 8 is a schematic view showing a third method of making the holograms used in the present invention.

Further, in this method, it is also possible to make the laser beam 303 into a sheet-like light beam and scan such light beam on the hologram photosensitive material 204 or to move the hologram photosensitive material 204 relative to the laser beam 303, for example, in the direction of arrow 305, and where a film-like hologram photosensitive material is used, mass production of holograms can be realized. FIG. 8 shows a single light beam exposure method differing from that shown in FIG. 7. This method is suitable for a case where the refractive index of the hologram photosensitive material 204 is high, and is used when the incident angle $\theta_r$ of the recording light beam exceeds the critical angle with respect to the substrate or the hologram recording material and it is difficult to set the incident angle $\theta_r$ in the air.

For example, the incident angle $\theta_r$ of the recording light onto the green light reflecting hologram is $\theta_r=53.34°$ when $n_1=1.5$, but if use is not made of a hologram photosensitive material in which $n_1=n_2=1.7$, $\theta'_r=41.79°$ (in a hologram photosensitive material of $n=1.7$) and thus, the incident angle $\theta_r$ of the recording light in the air becomes absent. However, as shown in FIG. 8, the vertical angle $\theta_p$ of a prism 401, the refractive index $n_p$ of the prism 401 and the incident angle $\theta_{rp}$ of the light beam 207 onto the prism 401 can be suitably adjusted. If for example, $n_p=1.7$ and $\theta_p=41.79°$ and $\theta_{rp}=0°$, a hologram photosensitive material of $n_1=1.7$ can be endowed with the green light reflecting characteristic.

Further, if this method is used, a red light reflecting hologram can also be made, and if for example, $\lambda_p=\lambda_R=613$ nm and $\theta_{in}=45°$ and $n_1=n_2=1.5$ and $\lambda_r=514.5$ nm according to the aforementioned equation, $\theta_r=42.25°$ and thus, the recording light can be made to be incident on a hologram photosensitive material of refractive index 1.5 so that the incident angle in the photosensitive material may be $\theta_r=42.25°$.

In the projection type display apparatus shown in FIG. 5, there is shown a color-resolving and color-combining system using a blue light reflecting hologram and a green light reflecting hologram, but according to the above-described method, there can be constructed an apparatus having a color-resolving and color-combining system using a red light reflecting hologram and a blue light or green light reflecting hologram.

Figure 9:
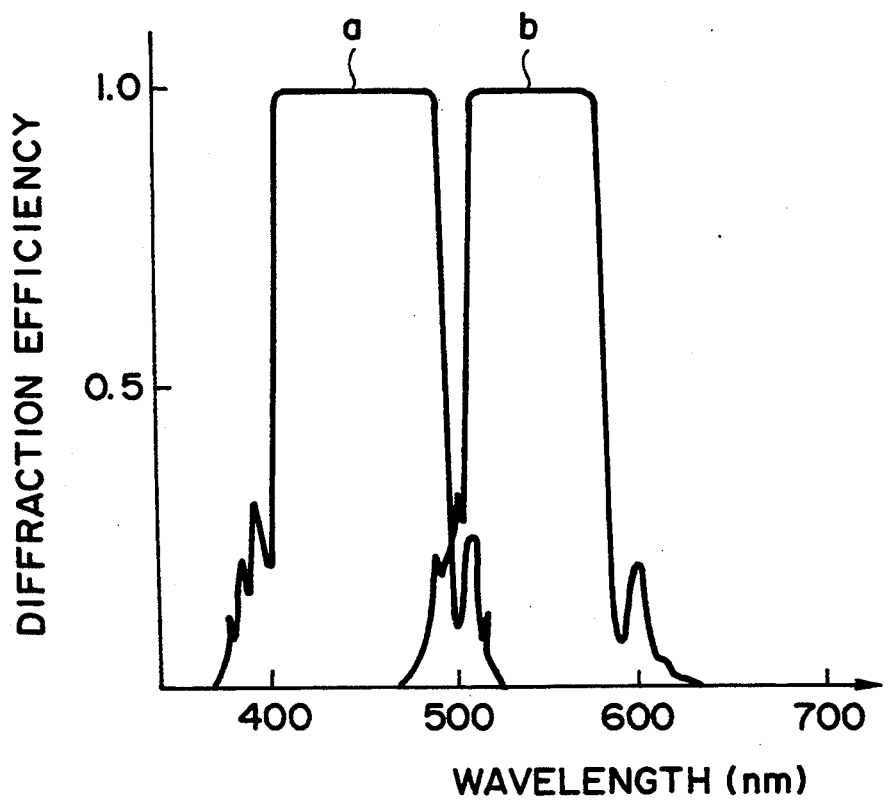
FIG. 9 is a graph showing the wavelength selectivity (corresponding to spectral reflectivity) of the hologram used in the present invention.

FIG. 9 is a graph showing the wavelength selection characteristics (which correspond to the spectral reflectivity characteristics of ordinary optical elements) of an example of the blue light reflecting hologram and green light reflecting hologram usable in the projection type display apparatus shown in FIG. 5, and in this figure, a curve a indicates the characteristic of the blue light reflecting hologram and a curve b indicates the characteristic of the green light reflecting hologram. As is apparent from FIG. 9, the center wavelength and band width of each hologram are as follows:

$$\lambda_G = 540 \text{ nm}, \Delta\lambda_G = 80 \text{ nm}$$

$$\lambda_B = 450 \text{ nm}, \Delta\lambda_B = 100 \text{ nm}$$

As the parameters of the holograms at this time, the film thicknesses of the both holograms are about 8 μm, the refractive index $n_1$ of the hologram photosensitive material and the average refractive index $n_2$ of the holograms are equal to each other, i.e., $n_1 = n_2 = 1.5$, and the modulation ratio of refractive index $\Delta n$, in the case of the blue light reflecting hologram, is $$\Delta n_B = 0.28,$$

and in the case of the green light reflecting hologram, is $$\Delta n_G = 0.19.$$

The above-mentioned modulation ratio of refractive index $\Delta n$ is a value calculated back from the actually measured value by the use of the aforementioned Kogelnik's combined wave theory.

Further, the diffraction efficiency (reflectivity) of the hologram at this time has been approximately 100%, and the difference between the P-polarized light and the S-polarized light has been within several percent. As regards the wavelength for which the diffraction efficiency is 0% (the cut-off wavelength), there has been no great difference between the P-polarized light and the S-polarized light. If the projection type display apparatus shown in FIG. 5 can be constructed by the use of such holograms, as the red component light of the white light fro the light source 102, a light beam of wavelength 580 nm or greater and of cut-off wavelength $\lambda_{cut}$ or less of the heat cut filter 103 will enter the second reflection type light bulb 105R. In an ordinary apparatus, the cut-off wavelength of the heat cut filter 103 is of the order of 700 nm, but in the present apparatus, this cut-off wavelength is set to the order of 650 nm and light in the near-infrared range unnecessary as the red component light is cut and caused to enter the second reflection type light bulb 105R.

As a matter of course, it is also possible to adopt the order of 700 nm as the cut-off wavelength of the heat cut filter 103 as is usual, and discretely provide a red filter having a cut-off wavelength of the order of 650 nm in the optical path of the reflection type light bulb 105R and the holograms.

The incident angle characteristic of the holograms will now be described.

Figure 10:
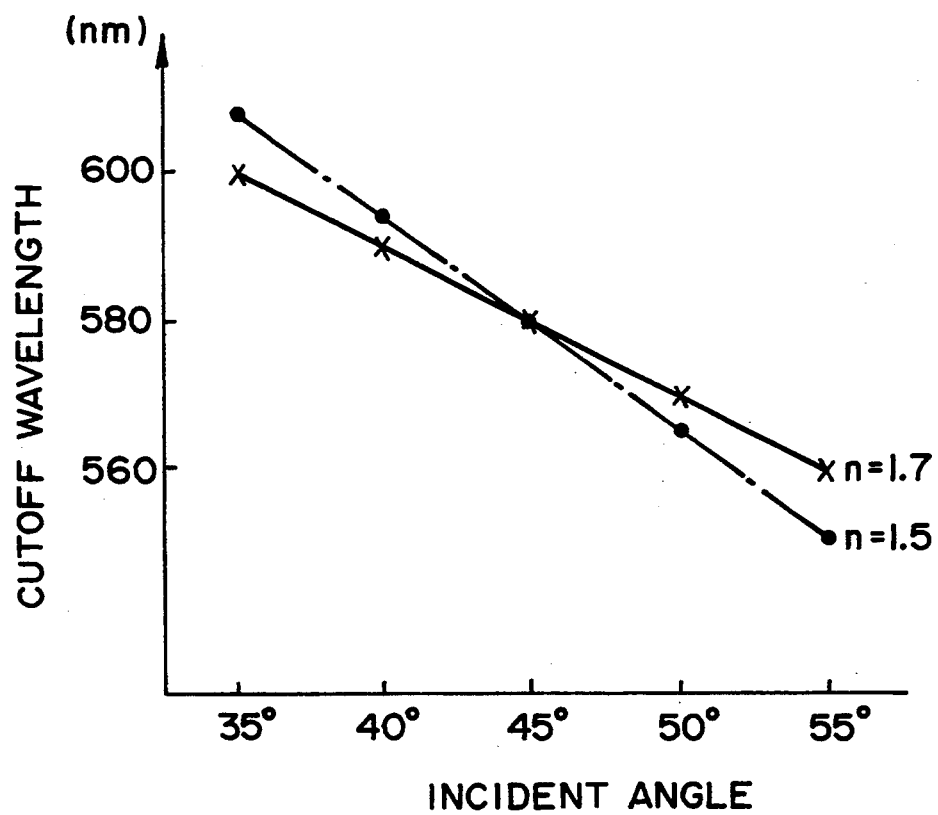
FIG. 10 is a graph showing a variation in the cutoff wavelength on the long wavelength side of a green light reflecting hologram for a variation in the incident angle of a light beam.

FIG. 10 shows the shift of wavelength relative to the incident angle onto a certain hologram, and shows the cut-off wavelength on the long wavelength side of the green light reflecting hologram. As a parameter, the average refractive index of the holograms has been chosen, and cases where n=1.5 and n=1.7 are shown.

As is apparent from FIG. 10, this hologram is more excellent in the incident angle characteristic when the refractive index thereof is higher, and where the refractive index is 1.7, the cut-off wavelength fluctuates by about ±10 nm for a variation of ±5° in the incident angle. However, even if a hologram material having of refractive index of 1.5 is used, the cut-off wavelength fluctuates by the order of ±14 nm for a variation of ±5° in the incident angle, and such material is strong for variations in the incident angle, as compared with ordinary dichroic multilayer film. Of course, this nature does not depend on P-polarized light and S-polarized light.

From this point as well, the use of holograms in a projection type display apparatus is advantageous. The volume phase holograms used in the present invention have the characteristic of exhibiting high diffraction efficiency in a certain wavelength range (referred to as the band) and particularly, Lipman holograms which are good in that characteristic are best suited.

The projector illustrated in FIG. 5 is one using reflection type liquid crystal bulbs, but it is also possible to use holograms in lieu of the dichroic mirrors of the projector using the transmission type liquid crystal light bulbs as shown in Applicant's U.S. Pat. No. 4,989,076.

Since in the above-described projector, color separation and color combination are accomplished by the use of holograms having little polarization dependency, the intensity of image light can be improved and there can be obtained clear-cut bright images in which the occurrence of flare and ghost by the re-entrance of light into other liquid crystal devices is prevented.

Also, the making of holograms is done by recording an interference fringe pattern by a laser beam on a sensitive material and therefore, it is possible to make elements of large area and particularly, this is suitable for mass production if the interference fringe pattern is recorded on a film-like hologram photosensitive material by the use of a single light beam exposure method. Further, holograms are strong for variations in the incident angle of a light beam, as compared with dichroic multilayer film and as a result, color blur and color misregistration during color separation and color combination become little.

What is claimed is:

1. A projector having:
   a first optical system provided with a first volume type hologram means for reflectively diffracting a first beam of a certain color in a radiation beam from a radiation source and transmitting a second beam of another color in said radiation beam to thereby divide said radiation beam;
   means for modulating said first beam and generating a first modulated beam indicative of a first image, and modulating said second beam and generating a second modulated beam indicative of a second image; and
   a second optical system provided with a second volume type hologram means for reflectively diffracting said first modulated beam and transmitting said second modulated beam therethrough to thereby combine said two beams, said second optical system projecting said first and second images onto a predetermined plane.

2. A projector according to claim 1, wherein said first and second volume type hologram means comprise a common volume type hologram.

3. A projector according to claim 2, wherein said modulating and generating means is provided with a first light valve for modulating and reflecting said first beam and forming said first modulated beam, and a second light valve for modulating and reflecting said second beam and forming said second modulated beam.

4. A projector according to claim 1, wherein said modulating and generating means is provided with a first light valve for modulating by being made to transmit therethrough said first beam and forming said first modulated beam, and a second light valve for modulating by being made to transmit therethrough said second beam and forming said second modulated beam.

5. A projector having:
means for supplying a substantially collimated beam including first, second and third beams differing in color from one another;
a polarizing beam splitter provided in the path of said collimated beam;
a first light valve for reflecting said first beam and modulating the plane of polarization thereof to thereby form a first image;
a second light valve for reflecting said second beam and modulating the plane of polarization thereof to thereby form a second image;
a third light valve for reflecting said third beam and modulating the plane of polarization thereof to thereby form a third image;
an optical system provided with first and second volume type holograms means for dividing said collimated beam from said polarizing beam splitter into said first, second and third beams and directing them to said light valves, respectively, and combining the first, second and third beams reflected and modulated by said light valves and directing them to said polarizing beam splitter, said first volume type hologram means reflectively diffracting said first beam, said second volume type hologram means reflectively diffracting said second beam, and
a projection optical system for receiving the first, second and third beams reflected and modulated by said light valves, respectively, through said polarizing beam splitter, and projecting said images onto a predetermined plane.

6. A projector according to claim 5, wherein said first and second volume type hologram means are provided so as to perpendicularly intersect each other.

7. A projector according to claim 6, wherein said first and second volume type hologram means each are divided into a pair of portions.

8. A projector according to claim 5, wherein said first and second volume type hologram means are arranged parallel to each other.

9. A projector according to claim 5, wherein each of said light valves comprises a reflection type liquid crystal light valve.

10. A method for projecting an image comprising:
a step of making a radiation beam divide into a first beam and a second beam mutually having different colors by a hologram means, wherein said hologram means reflectively diffracts said first beam and transmits said second beam;
a step of forming a first modulated beam and a second modulated beam to produce images mutually having different colors by modulating said first beam and said second beam; and
a step of projecting said first modulated beam and said second modulated beam on a predetermined surface.

11. A method according to claim 10, wherein said hologram means comprises a volume type hologram.

12. A method for projecting an image comprising:
a step of forming a first modulated beam and a second modulated beam to produce images mutually having different colors by modulating a first beam and a second beam mutually having different colors;
a step of combining said first modulated beam and said second modulated beam by a hologram means, wherein said hologram means reflectively diffracts said first modulated beam and transmits said second modulated beam; and
a step of projecting said first modulated beam and said second modulated beam on a predetermined surface.

13. A method according to claim 12, wherein said hologram means comprises a volume type hologram.

14. A method for projecting an image comprising:
a step of dividing a radiation beam into a first beam and a second beam mutually having different colors by a hologram means, wherein said hologram means reflectively diffract a portion of said radiation beam and transmits another portion of said radiation beam;
a step of forming a first modulated beam and a second modulated beam to produce images mutually having different colors by modulating said first beam and said second beam respectively;
a step of combining said first modulated beam and said second modulated beam; and
a step of projecting said first modulated beam and said second modulated beam on a predetermined surface.

15. A method according to claim 14 wherein said step of combining said first and second modulated beams includes a step in which said first modulated beam is made to reflectively diffract by a hologram means while said second modulated beam is transmitted through said hologram means whereby said first modulated beam and said second modulated beam are combined.

16. A method according to claim 15 wherein the hologram means used in said step of dividing said radiation beam is combined with the hologram means used in said step of combining said first beam and said second beam.

17. A method of forming an information signal comprising:
a step of dividing a radiation beam into a first beam and a second beam mutually having different colors by a hologram means, wherein said hologram means reflectively diffracts said first beam and transmits said second beam; and
a step of forming a first modulated beam and a second modulated beam mutually producing different colors by making polarization states of said first beam and said second beam change respectively.

18. A method according to claim 17 includes
a step of combining said first modulated beam and said second modulated beam by a hologram means.

19. A method according to claim 17, wherein said hologram means comprises a volume type hologram.

* * * * *